United States Patent [19]

Hendee et al.

[11] Patent Number: 4,902,173

[45] Date of Patent: Feb. 20, 1990

[54] SYSTEM AND FILTER FOR PREVENTING CONTAMINATION OF PARTICULATE MATERIAL IN RAILROAD CAR DURING TRANSPORTATION AND UNLOADING

[75] Inventors: Alfred W. Hendee; Michael A. Click; Ralph E. Gerstung, all of Houston, Tex.

[73] Assignee: Hendee Enterprises, Inc., Houston, Tex.

[21] Appl. No.: 197,026

[22] Filed: May 20, 1988

[51] Int. Cl.$^4$ .............................................. B65G 53/24
[52] U.S. Cl. ...................................... 406/145; 55/361; 105/358
[58] Field of Search ................... 406/41, 145, 118–122, 406/171, 151; 222/630; 105/358, 360; 55/376, 381, 361, 374, 527

[56] References Cited

U.S. PATENT DOCUMENTS

| | | | |
|---|---|---|---|
| Re. 24,916 | 12/1960 | Oliver | 406/145 X |
| 2,629,637 | 2/1953 | Hornbrook | 406/120 |
| 2,650,726 | 9/1953 | Aller et al. | 406/145 X |
| 2,695,196 | 11/1954 | Talmey et al. | 406/145 X |
| 2,844,411 | 7/1958 | Aller | 406/145 |
| 2,962,325 | 11/1960 | Dorey | 406/145 X |
| 3,105,721 | 10/1963 | Collins et al. | 406/120 X |
| 3,162,490 | 12/1964 | Koranda et al. | 406/145 |
| 3,195,296 | 7/1965 | Janson | 55/361 X |
| 3,204,391 | 9/1965 | Schwab | 55/374 |
| 3,204,392 | 9/1965 | Schwab | 55/381 |
| 3,258,173 | 6/1966 | Koranda | 406/145 |
| 3,261,148 | 7/1966 | Wurtenberg | 55/376 X |
| 3,443,366 | 5/1969 | Schwab | 55/376 X |
| 3,524,304 | 8/1970 | Wittemeier | 55/381 X |
| 3,537,241 | 11/1970 | Wiegel et al. | 55/381 X |
| 3,538,686 | 11/1970 | Schwab | 55/381 X |
| 3,797,891 | 3/1974 | Fritz | 406/145 X |
| 3,871,848 | 3/1975 | Smith | 55/374 |
| 4,604,203 | 8/1986 | Kyle | 55/527 X |

FOREIGN PATENT DOCUMENTS

| | | | |
|---|---|---|---|
| 176995 | 10/1961 | Sweden | 55/374 |
| 879781 | 10/1961 | United Kingdom | 55/381 |

Primary Examiner—Joseph F. Peters, Jr.
Assistant Examiner—James M. Kannofsky
Attorney, Agent, or Firm—Pravel, Gambrell, Hewitt, Kimball & Krieger

[57] ABSTRACT

A system for preventing contamination of particulate material in a railroad hopper car during transportation and unloading of the material from the car, comprising transporting the material in the railroad hopper car with a filter on each of the various inlet and outlet openings of the car, then upon reaching the point for unloading, applying a vacuum to draw the material out of the car through one spout with its filter removed, while leaving the filters in place on the other openings in the car to prevent contamination of the product from external sources during transportation and unloading. The preferred filter for the railroad car spouts has a frame, a conical filter bag, and a filter bag support ring for mounting on a spout on the car.

9 Claims, 3 Drawing Sheets

SYSTEM AND FILTER FOR PREVENTING CONTAMINATION OF PARTICULATE MATERIAL IN RAILROAD CAR DURING TRANSPORTATION AND UNLOADING

FIELD OF THE INVENTION

This invention is useful in the field of shipping of powdered or granular dry products or other particulate material in railroad hopper cars. Such products are plastic resins, flour or sugar. Specifically, the invention deals with a system by which particulate matter in such hopper rail cars is transported and unloaded.

BACKGROUND OF THE INVENTION

Hopper rail cars are designed for the transport of dry products such as plastic resins, flour, sugar or other granular or powdered products. Such cars typically have one or more large manhole size hatches on the top and one or more smaller spouts on the bottom. These hatches and spouts are covered with metal covers and various sealing devices to be discussed later. The product to be transported is generally loaded through the top hatches such as from a hose or funnel at a bulk facility. The hatches are then closed and the car is transported to its unloading destination. At the unloading destination a vacuum hose is attached to one or more of the lower spouts and one or more of the upper hatches are opened to provide a vent. The product is then unloaded by applying a vacuum to the car through the lower spout with several lower spouts being used as required. Additional venting is frequently provided by opening lower spouts on the opposite side of the rail car from the lower spout to which the vacuum hose is attached. During shipment, in order to protect the material in the car from contamination, seals made from thin plastic membranes are usually placed over the top hatches and the lower spouts underneath the metal covers on these openings. When an opening is used for unloading, the plastic membrane seal must be removed to allow either the passage of product or the passage of air to provide a vent.

When the plastic seals are removed for unloading purposes, this leaves the interior of the car and its contents open to contamination from the surroundings. This contamination is accelerated when a vacuum is drawn on the unloading spout thereby pulling air from the atmosphere into the rail car through the vent openings. Along with the air pulled in, dirt and other contaminants are frequently pulled into the rail car interior thereby contaminating the product inside. In order to reduce the amount of this contamination, it is currently known to place portable filters over the openings being used as vents. These portable filters, however, are generally bulky and hard to handle; for that and other reasons, the use of the filters is frequently ignored by personnel responsible for unloading such hopper rail cars at the unloading facility. Even when the portable filters are used by unloading personnel, they do not generally fit tightly enough on the vent openings to provide a positive seal in order to exclude any contamination while allowing the required venting rate of air flow. A system and filter have been needed, therefore, to provide for positive filtration of the air entering the vent openings during unloading.

SUMMARY OF THE INVENTION

The present invention provides a system of insuring positive filtration of the vent openings of hopper rail cars during vacuum unloading requiring a minimum amount of effort by the unloading personnel. The present invention also provides a filter specifically suited to the implementation of this method. The filter is a specially designed filter assembly which is placed in the lower spouts and removed only for the attachment of a vacuum hose. Air drawn into the hopper rail car is filtered through this assembly to remove contaminants.

DETAILED DESCRIPTION OF THE INVENTION

Figures 1, 2:
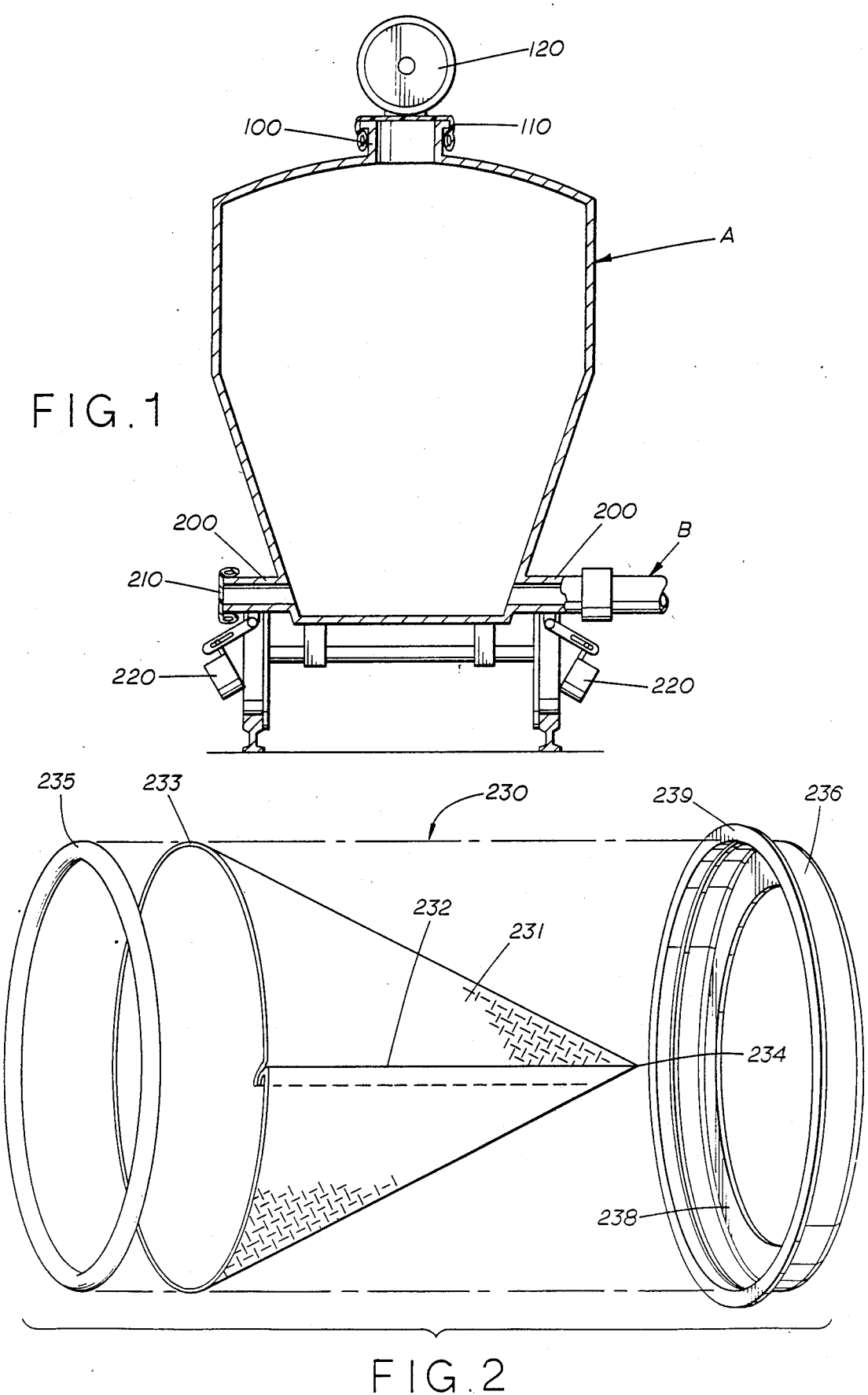
FIG. 1 is a schematic illustrating the prior art for transporting and then unloading particulate matter in a typical hopper rail car.
FIG. 2 is an expanded view of the filter device of the present invention.

Referring to FIG. 1, a schematic drawing is shown which illustrates the prior art method of sealing of a typical hopper rail car. The rail car A has upper hatch 100 and lower spouts 200. As is currently known, after the product is loaded into rail car A through upper hatch 100 plastic membrane seal 110 is placed over hatch 100 and then hatch cover 120 is closed over seal 110. Seal 110 is typically made of a plastic membrane in the shape of a bag. Placing seal 110 over the hatch before closing hatch cover 120 insures that the contents of the car will not be contaminated during transit. In a similar fashion lower spout 200 has placed over its outer end plastic membrane seal 210 over which is fastened metal spout cover 220. The use of lower plastic membrane seal 210 insures that contamination from roadside grit and other contaminants during transit is kept at a minimum.

When the hopper rail car A reaches its unloading destination, metal spout cover 220 is removed from one of the lower spouts 200 and vacuum hose B is attached thereto. In order to provide a vent, metal hatch cover 120 is raised and hatch membrane seal 110 is removed. Metal spout cover 220 is removed from one or more lower spouts 200 on the opposite side of rail car A from the spout 200 to which vacuum hose B is attached, and lower membrane seal 210 is removed from these lower spouts 200 which are opened to provide additional venting during the unloading operation. It is necessary to remove upper and lower membrane seals 110 and 210, because these do not allow the passage of air, and they would either restrict the unloading of the product or they would be sucked into the interior of rail car A when vacuum is applied via vacuum hose B. At some unloading facilities, bulky portable filters (not shown) are provided to be placed over the upper hatches and the lower spouts which are opened to provide vents.

Figure 5:
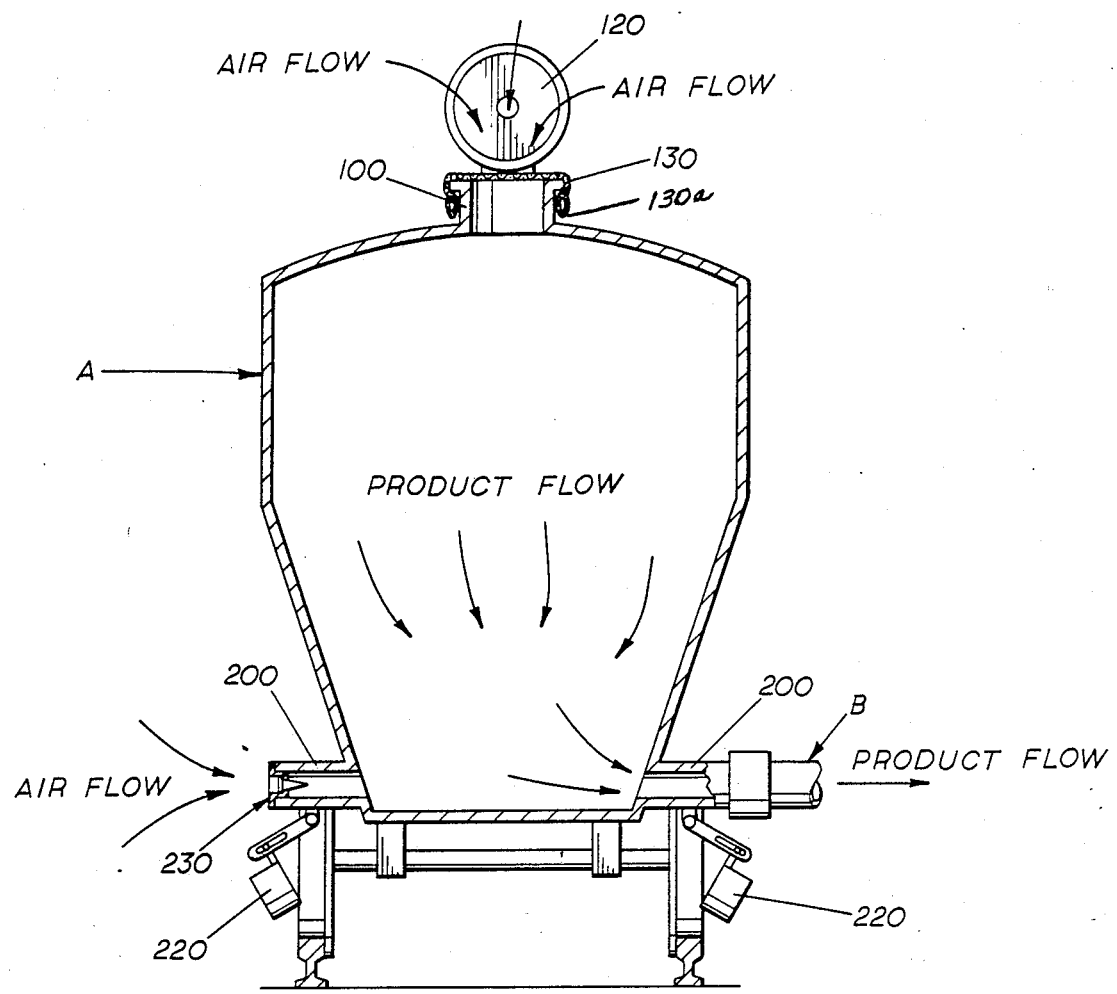
FIG. 5 is a schematic illustrating the system of the present invention for transporting and then unloading particulate material in a typical hopper rail car.

According to the present invention, upper and lower seals 110 and 210 will be replaced by seals 130 and 230, which are constructed of a filter medium such as spun bonded nylon, which will allow passage of air while restricting the passage of any contaminants. The filter medium used, whether spun bonded nylon fabric or some other medium, will have the capacity to exclude contaminants at least as small as the 30 micron range while allowing an air flow of at least 280 cubic feet per minute per square foot. For the top hatches 100, the filter seal 130 used will be in the form of a bag having an elastic edge 130a which is stretched over hatch 100 as shown in FIG. 5. Because of the structure of the lower spouts and because the air flow rate experienced at the lower spouts is much higher than that experienced at the top hatches, design of the filter seal used on the lower spouts is more critical.

Referring to FIG. 2, filter seal 230 is composed of filter bag 231, frame 236, and support ring 235. Bag 231 is sewn in the shape of a cone with seam 232, opening 233, and apex 234. Bag 231 is attached to support ring 235 by having opening 233 wrapped around support ring 235 and attached thereto. Support ring 235 is a substantially circular "O" ring having a circular cross section and which may be made of an elastomer such as a synthetic rubber but preferably is made of polyethylene. Support ring 235 with bag 231 attached as described above is inserted into frame 236 until support ring 235 rests inside frame 236 and upon flange 238.

Figure 3:
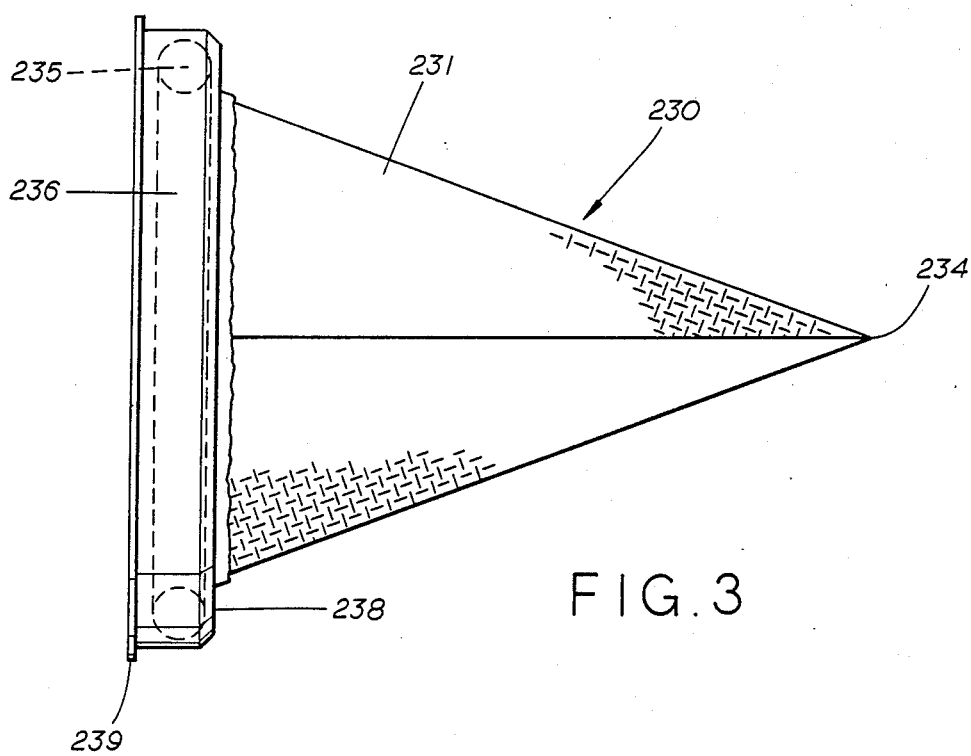
FIG. 3 is a side view of the assembled filter device of FIG. 2.

Referring to FIG. 3, it can be seen how filter seal 230 appears when assembled. Frame 236 supports support ring 235 on flange 238 and bag 231 is attached to support ring 235. The filter bag 231 is made in a conical shape to provide greater air flow and surface area than a flat filter surface across the inlet opening, and also to prevent the bag from being sucked into the tube 200 when the vacuum is applied. Because of the cone shape, greater air flow and therefore reduced unloading time is required as compared to a filter bag with a flat surface across the inlet opening. The unloading time is essentially as if no filter is present on the inlet spout 200. Apex 234 of bag 231 extends through frame 236 and into the interior of the spout as will be described later. The entire filter device is supported in the spout by means of lip 239 on frame 236 which is preferably made of polyethylene and by means of flange 238 bearing on an inner sleeve of the spout as will be described later.

Figure 4:
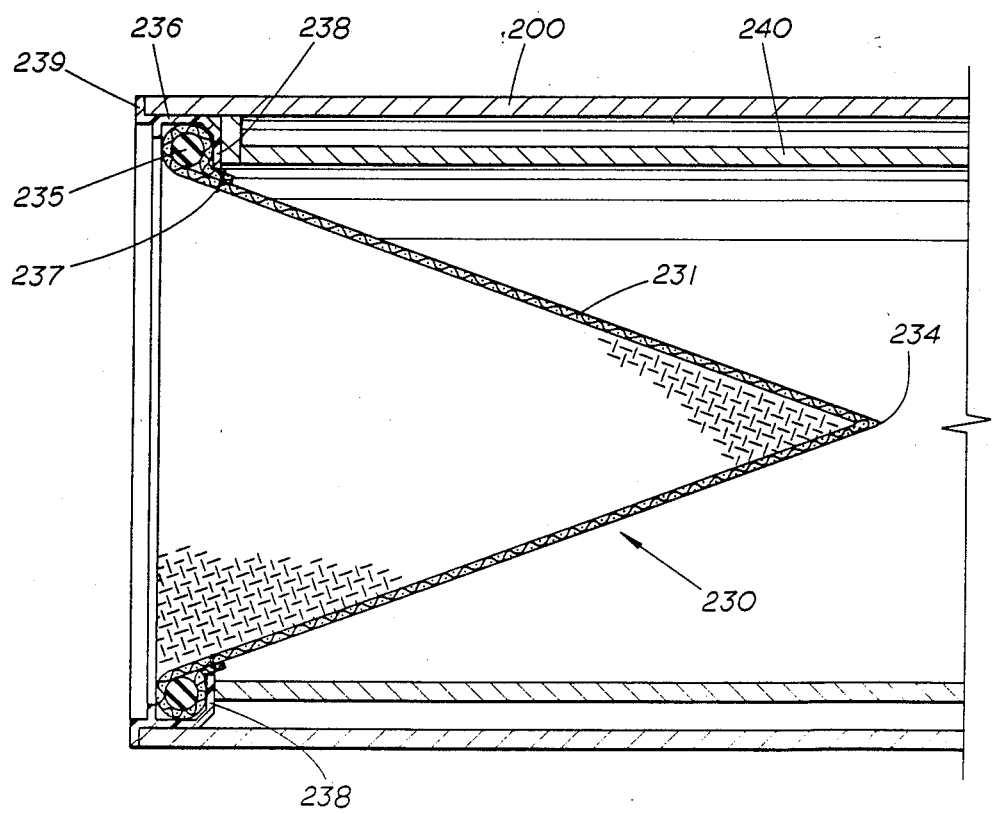
FIG. 4 is a sectional view of the filter device of FIG. 2 installed in a typical lower spout of a hopper rail car.

Referring to FIG. 4, the installation of filter seal 230 into spout 200 is shown. An internal sleeve 240 may be provided against which flange 238 of frame 236 will rest when filter seal 230 is installed in spout 200. However, such sleeve 240 is not necessary and is not usually present in a typical spout for a hopper rail car. Simultaneously lip 239 rests against the outer end of spout 200. Because of this manner of installation the entire filter device is installed in the interior of spout 200 with apex 234 of bag 231 extending toward the interior of spout 200. It can be seen that bag 231 is extended near its open end through the interior of support ring 235 and wrapped to the outside around support ring 235 before being sewn to itself at seam 237. This method of construction ensures that as vacuum pulls the bag into the interior of spout 200, bag 231 will pull more tightly on support ring 235 against flange 238 thereby increasing the efficiency of the seal between support ring 235 and flange 238.

Referring now to FIG. 5, the method of the present invention is illustrated. At the bulk facility, prior to loading product into rail car A through the hatch 100, lower filter seals 230 are placed in all of the spouts 200 after which metal covers 220 are secured on the outer ends of spouts 200. After the product is loaded in the rail car A, the upper filter seal 130 is placed over the hatch 100 and cover 120 is closed. During the movement of the rail car A to its destination for unloading the product, the cover 120 and seals 130 and 230 are in place and prevent the ingress of foreign material into the tank car thus maintaining the purity of the product.

At the unloading destination, hatch cover 120 is opened and upper filter seal 130 is left in place. The metal spout cover 220 is removed from the spout 200 which is to be used for unloading the product. The filter seal 230 is removed from the uncovered spout 200 in preparation for attaching vacuum hose B. On the other side of hopper rail car A from the spout 200 to which vacuum hose B is attached, one or more metal spout covers 220 are removed from their spouts 200 and filter seals 230 are left in place. When a vacuum is drawn on vacuum hose B, the product is drawn from the rail car through the spout 200 to which vacuum hose B is attached. Air is drawn into rail car A through hatch 100 and venting spout 200 on the opposite side of rail car A from spout 200 to which vacuum hose B is attached. Since the cover 130 and the seals 230 are in place, as explained, it is not necessary for unloading personnel to place any filters or other apparatus over the venting openings in rail car A during such unloading of the product. The only operation required by unloading personnel other than opening the metal covers 120 and 220 is to remove filter seal 230 from the spout to which vacuum hose B will be attached.

After unloading is completed, the filter seal 230 which was removed from its spout 200 is replaced therein and the corresponding metal spout cover 220 is also replaced. An added advantage of the present invention is that when rail car A is returned to its loading destination, personnel at the loading destination can check the condition of filter seals 130 and 230 to determine whether they were in place during the unloading operation. The presence of dirt or other contaminants on the outer surface of filter seals 230 will indicate that these seals were left in place during the unloading operation.

Although the invention has been described above for a tank car without compartments, it is usual for this type of car to have four compartments, each compartment having two top hatches 100 and four bottom spouts 200.

The foregoing description of the method and apparatus of the present invention is intended to be illustrative. Modifications of the invention described here will be apparent to those skilled in the art. It is intended that all such modifications are included in the appended claims.

We claim:

1. A system for transporting and unloading a railroad hopper car loaded with particulate material while preventing contamination of the particulate material during the transportation and unloading, comprising the steps of:

removing an originally installed metal cover from each originally provided opening in a hopper car to be used for unloading particulate material which has been loaded into the car prior to transportation;

placing a bag filter on each opening from which a metal cover has been removed;

replacing the originally installed metal cover on each opening;

then transporting said car to its unloading destination with the bag filters and metal covers in place to prevent contamination of the particulate material from external sources during such transportation;

thereafter removing the metal cover and bag filter from a first of said openings and attaching a vacuum hose thereto for unloading the particulate material;

removing the originally installed metal cover from a second of said openings;

leaving the bag filter on the second of said openings during the unloading of the material; and then unloading the particulate material from said car by applying a vacuum through said first opening and thereby drawing air in through said bag in said second opening.

2. The system of claim 1, wherein:
said second opening is a hatch with a metal cover on the top of said car.

3. The system of claim 1, wherein:
said second opening is a spout with a metal cover attached to a lower portion of said car.

4. The system of claim 3, wherein:
said bag filter on said second opening has a conical shape with the apex thereof extending inwardly towards the interior of said car.

5. The system of claim 1, wherein:
said first opening is a spout with a metal cover attached to a lower portion of said railroad hopper car.

6. The system of claim 5, wherein:
said second opening is a spout with a metal cover attached to a lower portion of said car.

7. The system of claim 6, wherein:
said bag filter on said second opening has a conical shape with the apex thereof extending inwardly towards the interior of said car.

8. The system of claim 6, wherein:
said car has a third opening at the top thereof with a bag filter thereon.

9. The system of claim 8, wherein:
said bag filter on said second opening has a conical shape with the apex thereof extending inwardly towards the interior of the car.

* * * * *